(12) United States Patent
Kumakura et al.

(10) Patent No.: US 10,086,529 B2
(45) Date of Patent: Oct. 2, 2018

(54) POWER PLANER CONFIGURED TO RESTRAIN HEAT GENERATION OF CONTROL PORTION

(71) Applicant: HITACHI KOKI CO., LTD., Tokyo (JP)

(72) Inventors: Takeru Kumakura, Hitachinaka (JP); Akira Onose, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 14/575,842

(22) Filed: Dec. 18, 2014

(65) Prior Publication Data

US 2015/0183125 A1 Jul. 2, 2015

(30) Foreign Application Priority Data

Dec. 27, 2013 (JP) ................................ 2013-273087

(51) Int. Cl.
*B27C 1/10* (2006.01)
*B23Q 11/10* (2006.01)

(52) U.S. Cl.
CPC ............ *B27C 1/10* (2013.01); *B23Q 11/1092* (2013.01)

(58) Field of Classification Search
CPC ............................. B27C 1/10; B23Q 11/1092
USPC .......................................................... 30/475
See application file for complete search history.

(56) References Cited

U.S. PATENT DOCUMENTS

| 1,980,056 | A | * | 11/1934 | Hedeby ................... B27C 1/10 |
| | | | | 30/475 |
| 2,672,172 | A | * | 3/1954 | Godfrey ............... B23Q 11/005 |
| | | | | 30/475 |
| 4,601,104 | A | * | 7/1986 | Zaiser ................. B23Q 11/005 |
| | | | | 30/475 |
| 5,383,275 | A | * | 1/1995 | Hild ................... B23Q 11/0042 |
| | | | | 144/117.4 |

(Continued)

FOREIGN PATENT DOCUMENTS

| CN | 2529746 Y | 1/2003 |
| CN | 1911609 A | 2/2007 |

(Continued)

OTHER PUBLICATIONS

English translation for JPH 09272073, Published Oct. 1997.*

(Continued)

*Primary Examiner* — Hwei C Payer
(74) *Attorney, Agent, or Firm* — Kilpatrick Townsend & Stockton LLP

(57) ABSTRACT

A power planer includes a casing, a motor having rotation shaft, a power supply portion for supplying electric power to the motor, a control portion, a cutter block, and a fan. The casing has intake and discharge openings and provides an air passage from the intake opening to the discharge opening. The control portion is connected to the electric motor and to the power supply portion. The cutter block has an axis parallel to the rotation shaft, and is supported to the casing and rotatable about the axis. A blade is provided in the cutter block. The fan is provided in the casing and configured to generate air stream within the casing and flowing along the air passage in a flowing direction. The air passage includes a control portion cooling passage for cooling the latter. The fan is positioned downstream of the control portion in the flowing direction.

14 Claims, 9 Drawing Sheets

(56) References Cited

U.S. PATENT DOCUMENTS

| | | | | |
|---|---|---|---|---|
| 5,463,816 | A * | 11/1995 | Bellew | B23Q 11/0042 144/252.1 |
| 5,815,934 | A * | 10/1998 | Eichberger | B23Q 11/0046 144/252.1 |
| 6,123,158 | A | 9/2000 | Steffen | |
| 6,688,349 | B2 * | 2/2004 | Stoeger et al. | B23Q 11/0042 144/117.4 |
| 7,549,450 | B2 * | 6/2009 | Thomas | B23Q 11/005 144/136.95 |
| 8,136,559 | B2 * | 3/2012 | Rosenau | B27C 1/10 144/154.5 |
| 2004/0068875 | A1 * | 4/2004 | Wang | B23Q 11/005 30/207 |
| 2004/0124721 | A1 * | 7/2004 | Pfisterer | B25D 17/20 310/51 |
| 2008/0061742 | A1 | 3/2008 | Funabashi et al. | |
| 2009/0000696 | A1 * | 1/2009 | Grossman | B27C 1/10 144/117.4 |
| 2009/0145621 | A1 | 6/2009 | Lau et al. | |
| 2010/0176764 | A1 | 7/2010 | Tachikawa et al. | |
| 2011/0171887 | A1 * | 7/2011 | Tanimoto | B24B 23/028 451/359 |
| 2013/0255981 | A1 | 10/2013 | Noto et al. | |
| 2014/0331508 | A1 * | 11/2014 | Simm | B27C 1/10 30/475 |
| 2015/0026985 | A1 | 1/2015 | Yamaguchi et al. | |
| 2015/0183125 | A1 * | 7/2015 | Kumakura | B27C 1/10 30/475 |

FOREIGN PATENT DOCUMENTS

| | | |
|---|---|---|
| CN | 101145686 A | 3/2008 |
| CN | 103358266 A | 10/2013 |
| DE | 35 42 466 A1 * | 6/1987 |
| EP | 1894688 A1 | 3/2008 |
| JP | 38-012997 Y | 6/1963 |
| JP | 46-019919 U | 7/1971 |
| JP | 61-130405 U | 8/1986 |
| JP | 09-272073 A | 10/1997 |
| JP | 2000-515435 A | 11/2000 |
| JP | 2008-062343 A | 3/2008 |
| JP | 2008-132893 A | 6/2008 |
| JP | 2009-137011 A | 6/2009 |
| JP | 2010-23354 A | 2/2010 |
| JP | 2011-101589 A | 5/2011 |
| JP | 2013-193133 A | 9/2013 |
| JP | 2013-202702 A | 10/2013 |
| WO | WO 2007/077050 A1 * | 7/2007 |

OTHER PUBLICATIONS

Japan Patent Office Notification for Reasons for Refusal for application 2013-273087 (dated Jul. 24, 2017) 13 pages with translation.
China Patent Office office action for patent application CN201410831987.1 (dated Jan. 19, 2018), 24 pages with translation.

* cited by examiner

FIG.7
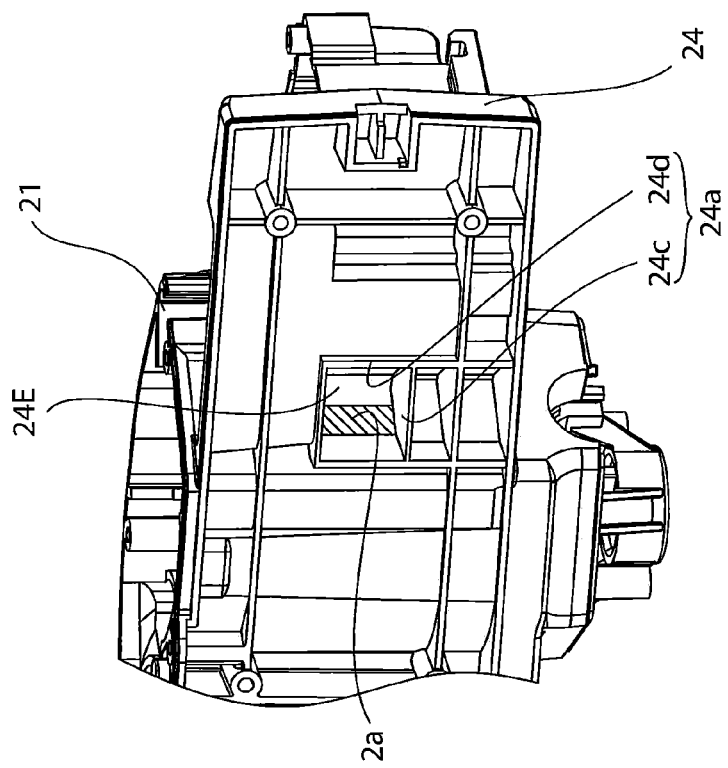
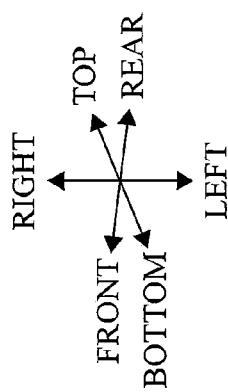

POWER PLANER CONFIGURED TO RESTRAIN HEAT GENERATION OF CONTROL PORTION

CROSS REFERENCE TO RELATED APPLICATION

This application claims priority from Japanese Patent Application No. 2013-273087 filed Dec. 27, 2013, the entire content of which is incorporated herein by reference.

TECHNICAL FIELD

The present invention relates to a power planer, and more particularly, to a portable cordless power planer.

BACKGROUND

A power planer having an electric motor as a drive source is known for surface finishing and adjustment in dimension of a woody workpiece. For the surface finishing, discharge of machining swarf or cutting chip is important. In case of insufficient discharge, cutting chip may abut on the workpiece to damage to a surface of the workpiece. Thus, surface finishing may be degraded.

In order to overcome this problem, Japanese Patent Application Publication No. 2010-023354 discloses a power planer provided with an discharge mechanism for discharging swarf. The disclosed power planer includes a fan provided coaxially with an electric motor generating air stream for discharging the swarf.

SUMMARY

According to the disclosed power planer, the air stream from the fan is mainly used for discharging the swarf outside. Therefore, in a case where a control unit including switching elements for controlling the electric motor of the power planer is provided, such air stream cannot be utilized for restraining heat generation of the control unit. Accordingly, heat generation from the control unit cannot be restrained.

In view of the foregoing, it is an object of the invention to provide a power planer capable of restraining heat generation from the control unit by using an air flow from the fan as a cooling air.

In order to attain the above and other objects, the invention provides a power planer including a casing, an electric motor, a power supply portion, a control portion, a cutter block, and a fan. The casing is formed with an intake opening and a discharge opening and provides an air passage from the intake opening to the discharge opening. The electric motor is provided in the casing and has a rotation shaft. The power supply portion is configured to supply electric power to the electric motor. The control portion is connected to the electric motor and to the power supply portion and is configured to control power supply to the electric motor. The cutter block has an axis directed in parallel to the rotation shaft, and is supported to the casing and is rotatable about the axis. A blade for cutting a workpiece is attachable to and detachable from the cutter block. The cutter block is rotationally driven upon rotation of the rotation shaft. The fan is provided in the casing and is configured to generate air stream within the casing and flowing along the air passage in a flowing direction. The air passage includes a control portion cooling passage for cooling the control portion. The fan is positioned downstream of the control portion in the flowing direction.

BRIEF DESCRIPTION OF THE DRAWINGS

In the drawings:

FIG. 7 is a bottom view of the power planer according to the first embodiment and showing a state where a rear base is removed for particularly showing a communication passage;

DETAILED DESCRIPTION

Figure 1:
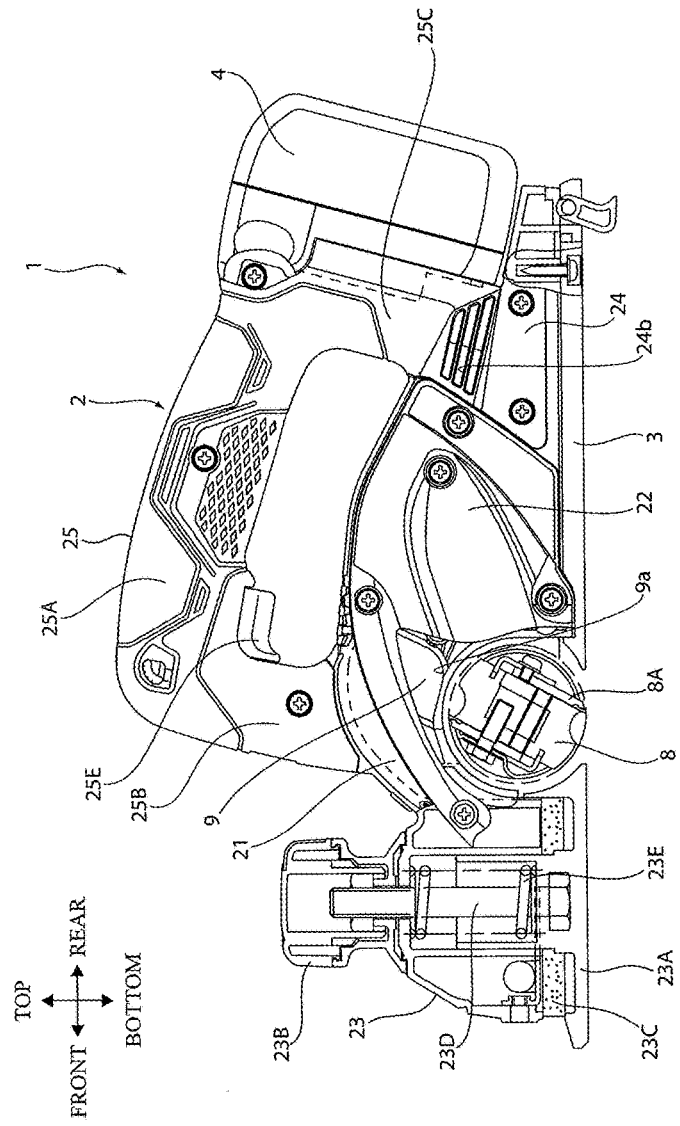
FIG. 1 is a partial cross-sectional side view of a portable power planer for showing an outer appearance and a partial internal structure according to a first embodiment of the present invention.

A power planer according to a first embodiment of the present invention will be described with reference to FIGS. 1 through 8. The first embodiment pertains to a portable power planer 1 including a housing 2, a rear base 3, a power supply portion 4, a control unit 5, an electric motor 6, a fan 7, and a cutter block 8 provided with blades 8A as shown in FIGS. 1 through 4. Cutting work is achieved by rotating the cutter block 8 driven by the motor 6 energized upon supply of electric power thereto from the power supply portion 4. In the following description, a direction from the power supply portion 4 to the cutter block 8 will be referred to as "frontward direction", and a direction opposite to the frontward direction will be referred to as "rearward direction". Further, a direction from the housing 2 to the rear base 3 will be referred to as "downward direction", and a direction opposite thereto will be referred to as "upward direction". Further, "rightward" and "leftward" will be used when viewing from a rear side of the portable power planer 1.

Figure 2:
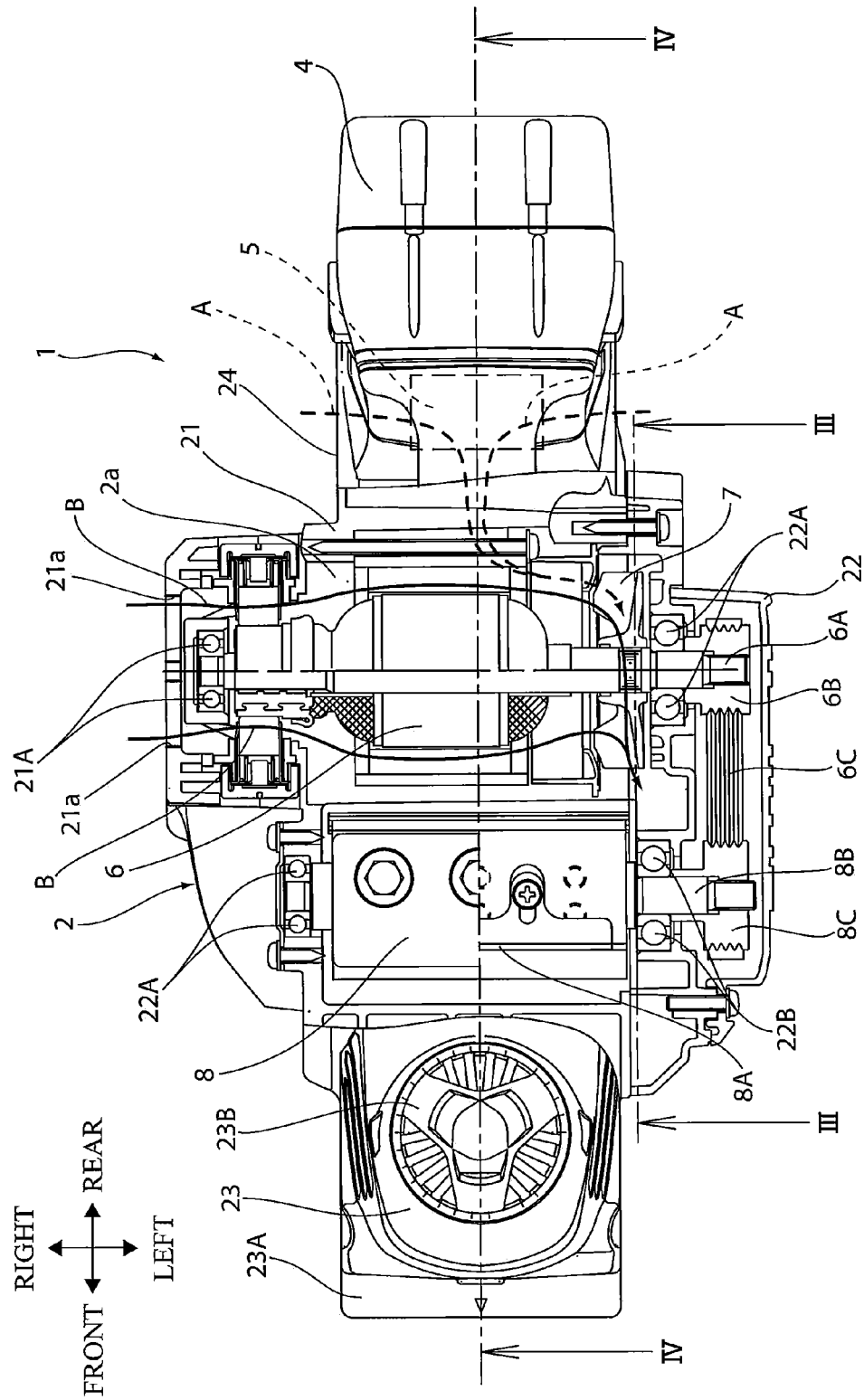
FIG. 2 is a partial cross-sectional plane view showing an internal structure of the power planer according to the first embodiment.
Figure 3:
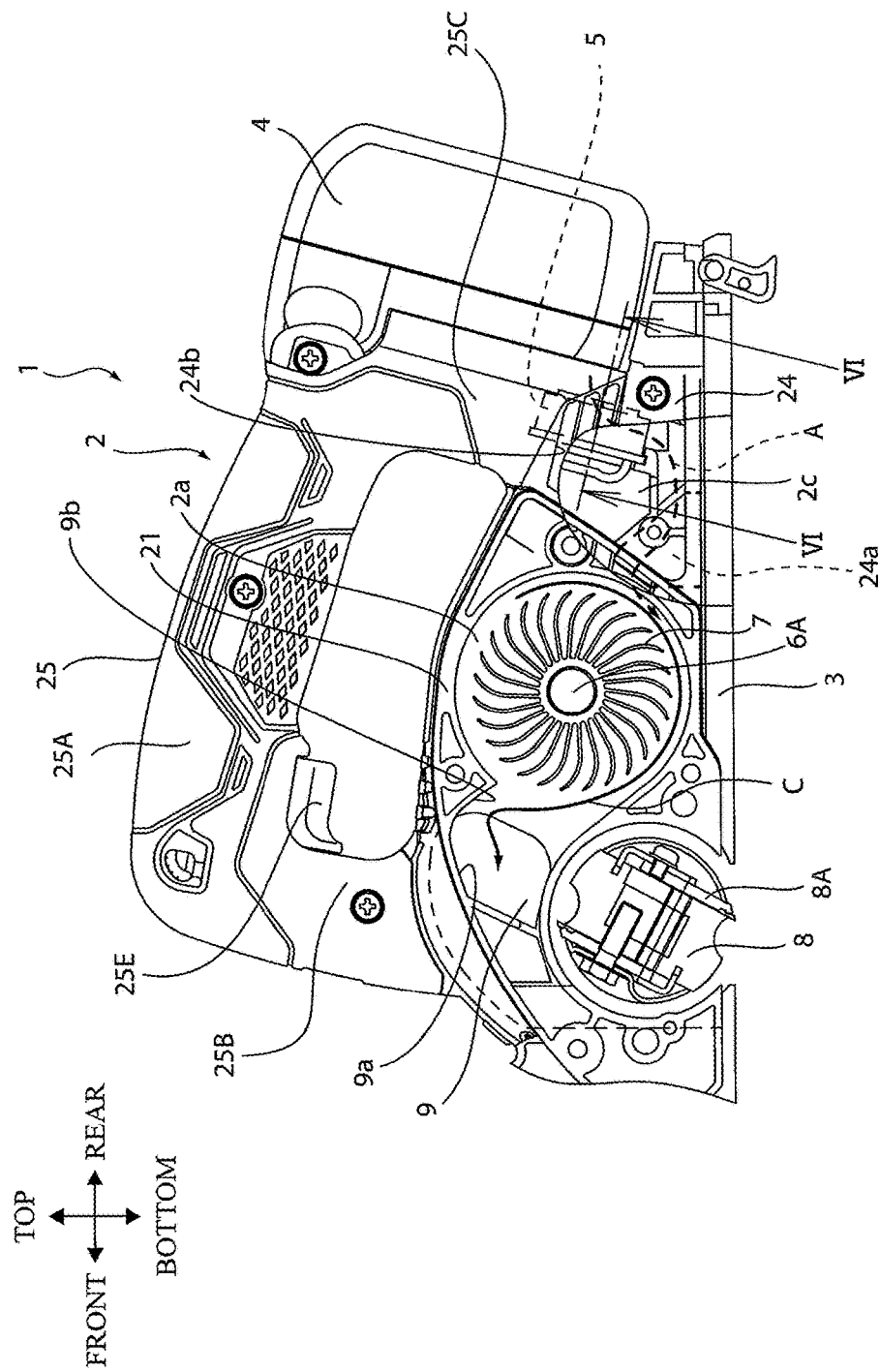
FIG. 3 is a cross-sectional view taken along a line III-III of FIG. 2 and showing the internal structure of the power planer according to the first embodiment.
Figure 4:
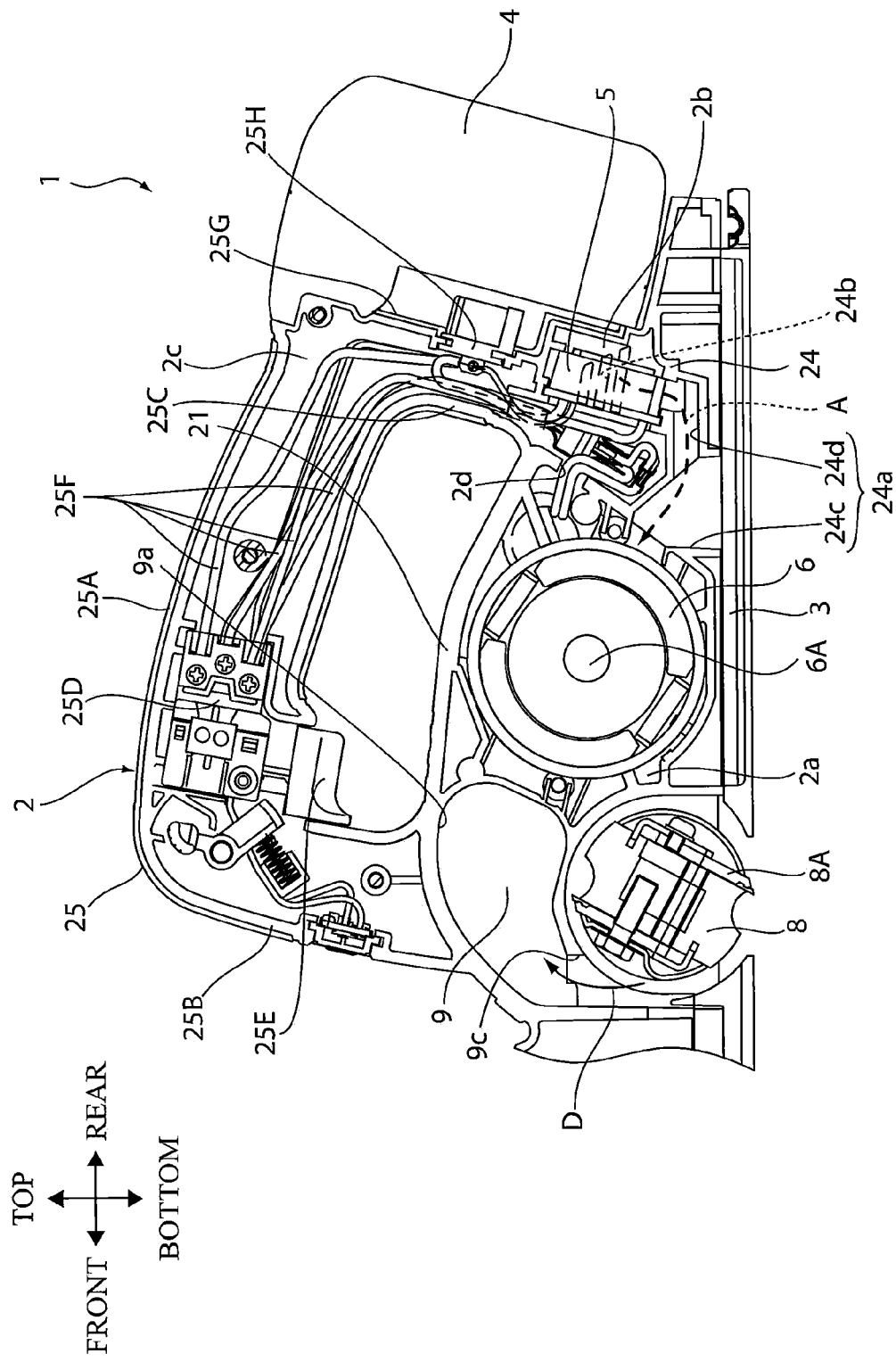
FIG. 4 is a cross-sectional view taken along a line IV-IV of FIG. 2 and showing the internal structure of the power planer according to the first embodiment.

As shown in FIG. 1, the housing 2 functions as an outer shell of the portable power planer 1, and includes a main housing 21, a gear housing 22, a front housing 23, a rear housing 24, and a handle housing 25. Further, as shown in FIGS. 2 through 4, a motor accommodation chamber 2a, a control portion accommodation chamber 2b, and a connection line accommodation chamber 2c are defined in an interior of the housing 2. The rear base 3 is generally rectangular shaped as viewed from a bottom of the portable power planer 1, and is provided at a lower end surface of the housing 2. The rear base 3 is adapted to be in abutment with a workpiece during planing operation with the portable power planer 1. The housing 2 is an example of a casing, and the rear base 3 is an example of a base.

The main housing 21 constitutes a main portion of the portable power planer 1, and accommodates therein the motor 6, the fan 7, the cutter block 8, and a swarf discharging portion 9. Further, the motor accommodation chamber 2a is defined in an interior of the main housing 21, and a plurality of inlet ports 21a are formed at a right side of the main housing 21.

As shown in FIG. 2, the motor 6 is accommodated in the motor accommodation chamber 2a defined at an intermediate portion of the interior of the main housing 21 in the frontward/rearward direction. The motor 6 has a rotation shaft 6A. The rotation shaft 6A extends in rightward/leftward direction or lateral direction through the main housing 21 and the gear housing 22, and is rotatably supported by ball bearings 21A, 22A provided at the main housing 21 and the gear housing 22, respectively. The rotation shaft 6A has a left end portion provided with a pulley 6B. Upon rotation of the motor 6, the rotation shaft 6A and the pulley 6B are rotationally driven.

The plurality of inlet ports 21a is adapted to provide communication between an outside of the housing 2 and the motor accommodation chamber 2a. These inlet ports 21a are formed at a right side wall of the main housing 21 and are positioned in confrontation with the motor 6.

The fan 7 is coaxially coupled to the rotation shaft 6A so as to perform integral rotation with the rotation shaft 6A. Upon rotation of the fan 7, air stream is generated within the housing 2. Further, the fan 7 is positioned adjacent to a boundary between the main housing 21 and the gear housing 22.

The cutter block 8 is generally cylindrical and extends in lateral direction. The cutter block 8 is positioned frontward of and downward of the motor 6 and is rotatably supported by the main housing 21 and the gear housing 22. Further, the cutter block 8 has a cutter block shaft 8B defining an axis extending approximately parallel to an axis of the rotation shaft 6A of the motor 6. The blades 8A extend in lateral direction and are provided at an outer surface of the cutter block shaft 8B.

The cutter block shaft 8B extends in lateral direction through the main housing 21 and the gear housing 22, and is rotatably supported to the main housing 21 and the gear housing 22 by ball bearings 21B, 22B, respectively. The cutter block shaft 8B has a left end portion to which a pulley 8C is coupled. An endless belt 6C is mounted on the pulleys 6B and 8C. Thus, rotation of the rotation shaft 6A is transmitted to the cutter block shaft 8B through the pulley 6B, the endless belt 6C and the pulley 8C. Two blades 8A are detachably attached to the cutter block 8 in relatively symmetrical manner with respect to the axis of the cutter block 8 when viewed from a lateral side.

As shown in FIGS. 3 and 4, the swarf discharging portion 9 is positioned frontward of the motor 6, and is formed with a swarf discharging hole 9a, a communication hole 9b, and an intake hole 9c. The swarf discharging hole 9a extends in a direction generally parallel to the axial direction of the rotation shaft 6A of the motor 6, and penetrates the main housing 21 in lateral direction. The swarf discharging hole 9a is positioned above the cutter block 8 and frontward of the motor 6. The swarf discharging hole 9a has a right open end functioning as an exhaust opening. The right open end of the swarf discharging hole 9a is an example of a discharge opening.

As shown in FIG. 3, the communication hole 9b is adapted to provide communication between a left open end of the swarf discharging hole 9a and a left end portion of the motor accommodation chamber 2a, so that air stream can flow from the motor accommodation chamber 2a to the swarf discharging hole 9a through the communication hole 9b. As shown in FIG. 4, the intake hole 9c is defined in the main housing 21 at a position frontward of and above the cutter block 8 for intaking swarf or cutting chip generated by the cutting operation with the cutter block 8 into the swarf discharging hole 9a. The intake hole 9c extends in lateral direction.

As shown in FIGS. 1 and 2, the gear housing 22 is positioned leftward of the main housing 21. The gear housing 22 defines an internal space in which the pulley 6B of the rotation shaft 6A, the endless belt 6C and the pulley 8C of the cutter block shaft 8B are accommodated. Further, the gear housing 22 closes a left end of the main housing 21, preventing the air stream flowing from the motor accommodation chamber 2a to the swarf discharging hole 9a through the fan 7 and the communication hole 9b from being scattered outside of the housing 2.

As shown in FIGS. 1 and 2, the front housing 23 is positioned frontward of the main housing 21 and is provided integrally therewith. The front housing 23 is provided with a mechanism for adjusting a cutting depth in cutting operation. The adjustment mechanism includes a front base 23A, a knob 23B, a resilient member 23C such as a compression coil spring, a bolt 23D, and a spring 23E.

The front base 23A is generally rectangular shaped as viewed from a bottom, and is provided at a lower end surface of the front housing 23 through the resilient member 23C. The bolt 23D extends upward from the front base 23A into an interior of the front housing 23. The spring 23E is disposed over the bolt 23D. The spring 23E has one end seated on the front base 23A and another end seated on the front housing 23 for biasing the front base 23A downward. The knob 23B is positioned above the front housing 23 and is threadingly engaged with the bolt 23D.

Cutting depth can be adjusted by rotating the knob 23B. More specifically, by rotating the knob 23B in a direction for releasing the knob 23B from the bolt 23D, the front base 23A is moved downward by the biasing force of the spring 23E. On the other hand, by rotating the knob 23B in a direction for advancing threading engagement with the bolt 23D, the front base 23A is moved upward compressing the spring 23E against the biasing three of the spring 23E. In this way, height of the front base 23A relative to the rear base 3 can be changed by the movement of the front base 23A in vertical direction, so that cutting depth during cutting operation can be adjusted.

As shown in FIGS. 1, 3 and 4, the rear housing 24 is positioned rearward of the main housing 21 and is provided integrally therewith. The rear housing 24 accommodates therein the control unit 5. Part of the connection line accommodation chamber 2c, the control portion accommodation chamber 2b, and a communication passage 24a are defined in an interior of the rear housing 24. The rear housing 24 has right and left walls each being formed with a plurality of inlet openings 24b. Each of inlet openings 24b is an example of an intake opening.

The part of the connection line accommodation chamber 2c is defined at a front portion of the rear housing 24, and positioned adjacent to the motor accommodation chamber 2a of the main housing 21. The control portion accommodation chamber 2b is defined at a rear portion of the rear housing 24 and positioned adjacent to the connection line accommodation chamber 2c. The control portion accommodation chamber 2b accommodates therein the control unit 5. Further, the plurality of inlet openings 24b formed at each side wall of the rear housing 24 is configured to provide communication between the interior of the control portion accommodation chamber 2b and the outside of the housing 2.

Figure 5:
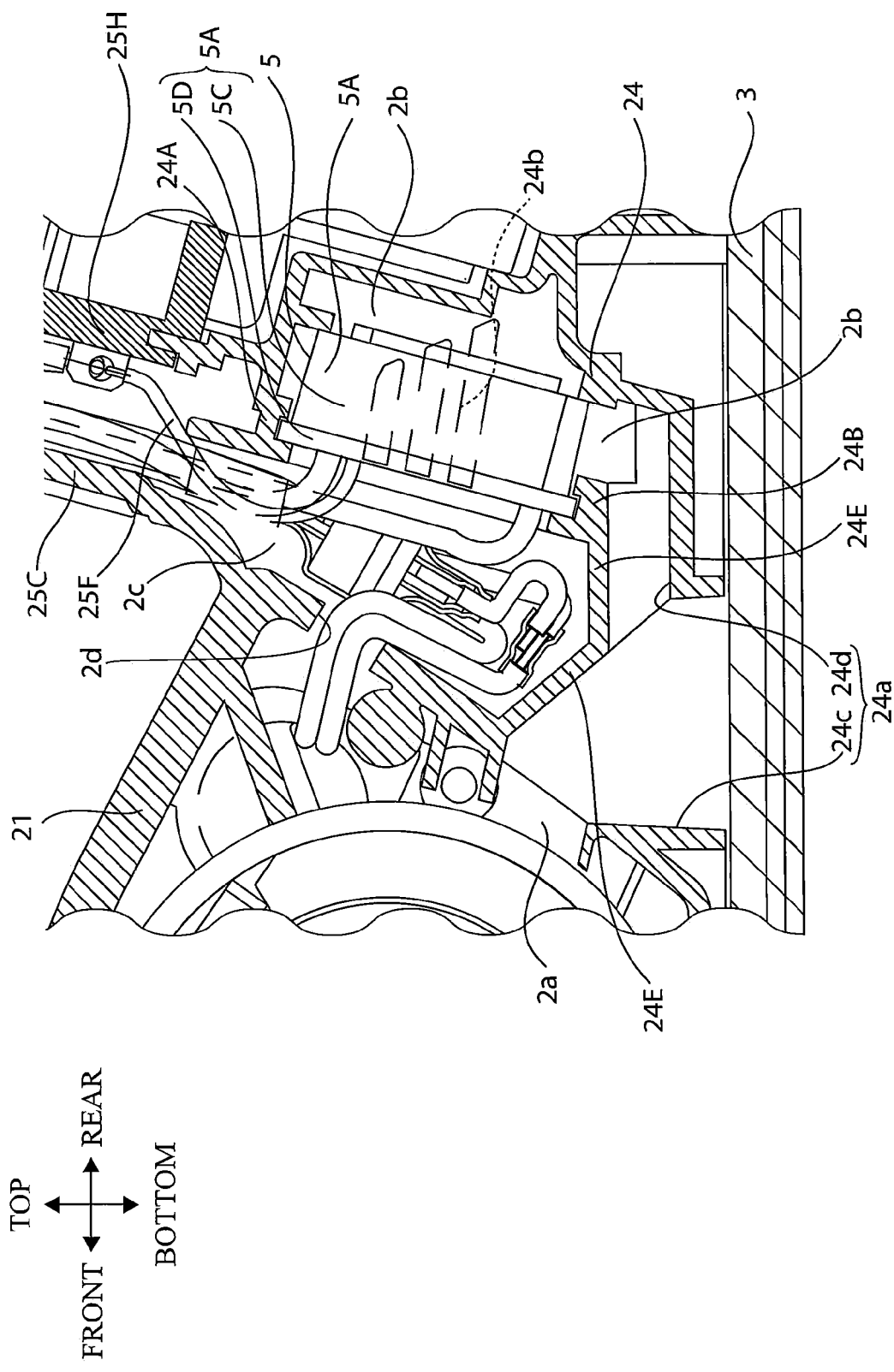
FIG. 5 is an enlarged view of a part of FIG. 4 and showing the internal structure of the power planer according to the first embodiment.
Figure 6:
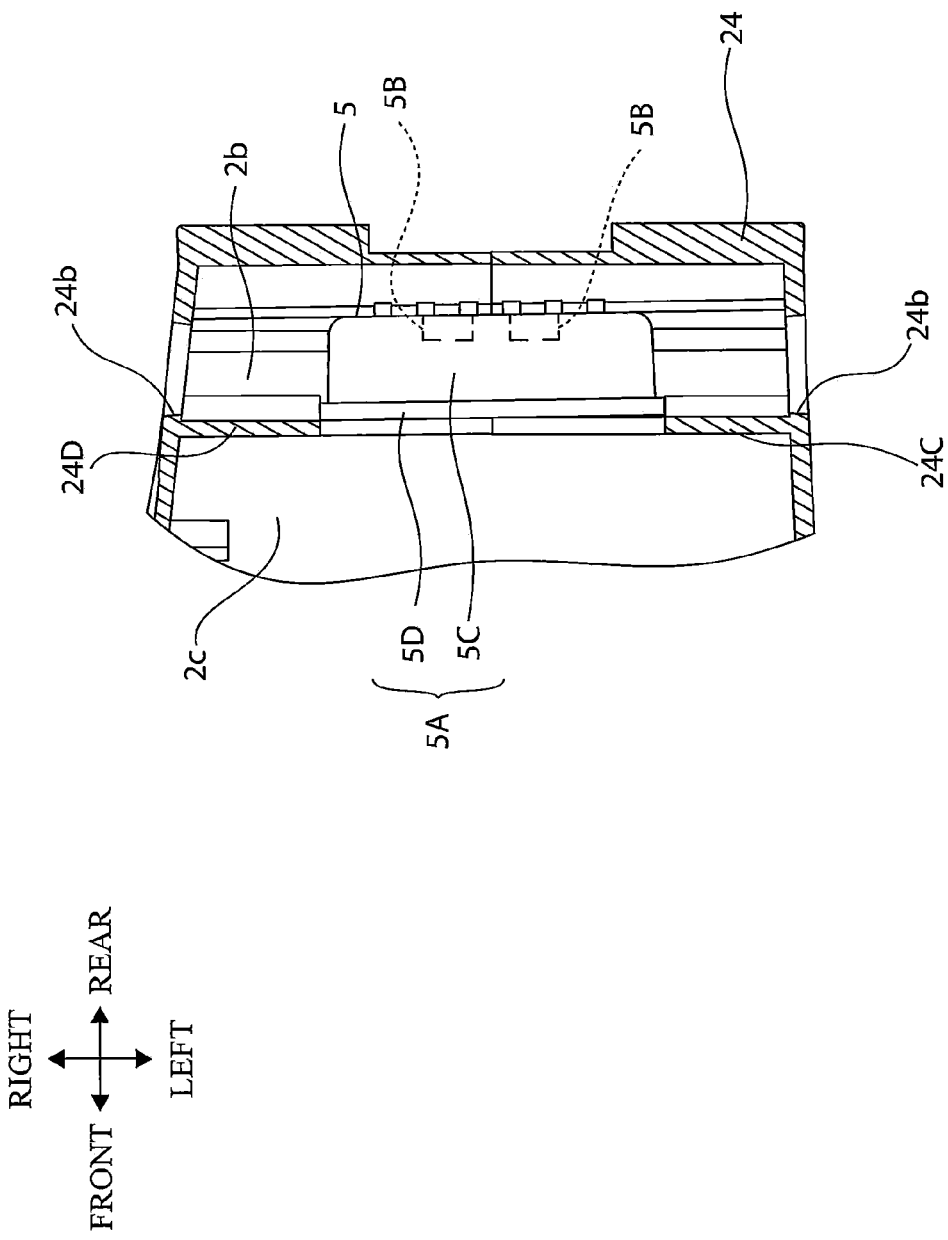
FIG. 6 is a cross-sectional view taken along a line VI-VI of FIG. 3 and showing a control unit of the power planer according to the first embodiment.
Figure 8:
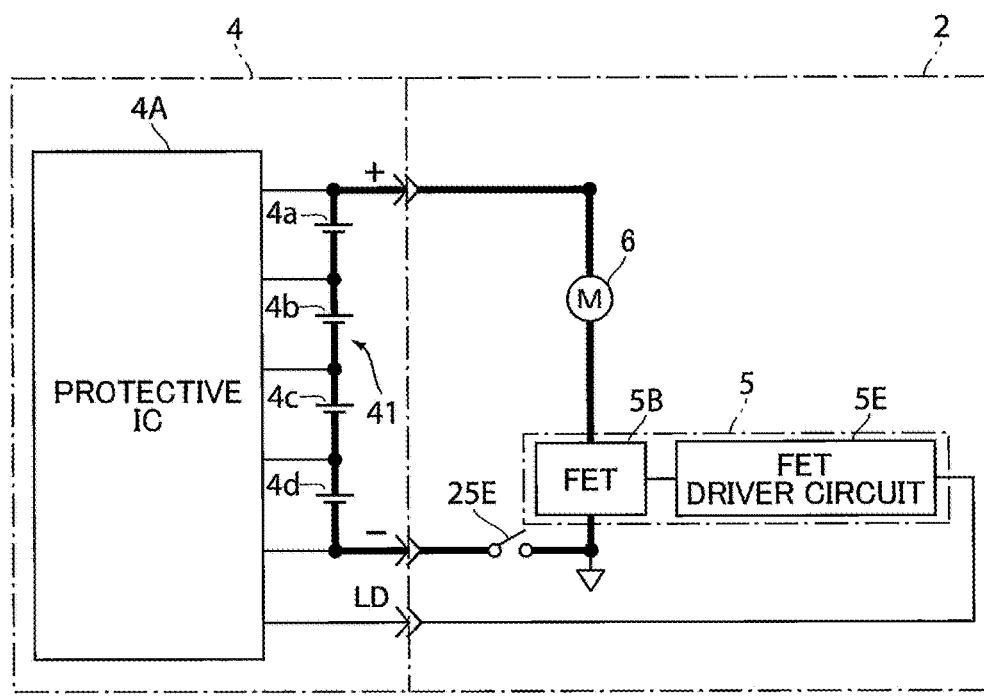
FIG. 8 is a circuit diagram showing circuit of a power supply portion and the control unit in the power planer according to the first embodiment.

As shown in FIGS. 5, 6 and 8, the control unit 5 is positioned opposite to the cutter block 8 with respect to the motor 6, and includes a board box 5A, FETs 5B, an FET driver circuit 5E, and a circuit board (not shown). The board box 5A includes a box portion 5C and a lid portion 5D. The box portion 5C is made from metal and is generally rectangular parallelepiped having a front open end. The FETs 5B surface-mounted on the circuit board (not shown) and the FET driver circuit 5E are accommodated in the board box 5A. Further, the board box 5A has a rear wall having a plurality of protrusions as heat dissipators. The control unit 5 is an example of a control portion. The circuit board is an example of a control board. Each of FETs 5B is an example of a control element. The board box 5A is an example of a board case.

The lid 5D is plate shaped having generally rectangular shape as viewed from front side for closing the front open end of the box portion 5C. The lid 5D has a dimension in vertical direction and lateral direction slightly greater than that of the box portion 5C. A connection line 25F connected to the FETs 5B in the box portion 5C extends frontward from a front end surface of the lid 5D. The lid 5D is supported by ribs 24A, 24B, 24C, 24D those being positioned at an inner side of and integral with the rear housing 24.

As shown in FIG. 5, the rib 24A has a groove denting upward and extending in lateral direction for fitting engagement with an upper end portion of the lid 5D, and the rib 24B has a groove denting downward and extending in lateral direction for fitting engagement with a lower end portion of the lid 5D. Further, as shown in FIG. 6, the rib 24C protrudes rightward from a left side wall of the rear housing 24 for abutment with a front surface of a left end portion of the lid 5D, and the rib 24D protrudes leftward from a right side wall of the rear housing 24 for abutment with a front surface of a right end portion of the lid 5D.

In this way, the lid 5D is nipped or interposed between the ribs 24A and 24B in vertical direction, and the lid 5D is supported to the rear housing 24 while the front surface of the lid 5D is in abutment with the ribs 24C, 24D. Thus, the control portion accommodation chamber 2b is hermetically defined by the inner surface of the rear housing 24 and the board box 5A. As a result, the control portion accommodation chamber 2b is shut off from the neighboring connection line accommodation chamber 2c. Consequently, this structure can prevent an external air introduced into the control portion accommodation chamber 2b through the inlet openings 24b by the rotation of the fan 7 from flowing into the connection line accommodation chamber 2c.

As shown in FIGS. 5 and 7, the communication passage 24a is adapted to communicate the control portion accommodation chamber 2b with the motor accommodation chamber 2a. The communication passage 24a is provided in the rear housing 24 at a position below and adjacent to the connection line accommodation chamber 2c. The communication passage 24a includes a through-hole 24e and a sideway hole 24d.

The through-hole 24c is formed at a laterally center portion of the bottom wall of the rear housing 24, and is directed into the motor accommodation chamber 2a. The sideway hole 24d is defined by an upper surface of the rear base 3 and an inner surface of the rear housing 24. The sideway hole 24d is connected to the laterally center portion of the lower surface of the control portion accommodation chamber 2b, and is communicated with the through-hole 24c. In order to form the communication passage 24a, a metal mold die is removed downward in FIG. 5 to form the through-hole 24c, and then an outer open end of the through-hole 24e is closed by the rear base 3, thereby forming the communication passage 24a.

The rear housing 24 integrally provides a rib 24E which prevents the through-hole 24c and the sideway hole 24d from being communicated with the connection line accommodation chamber 2c. The rib 24E is an example of a partition wall. In this way, since the rib 24E is provided between the communication passage 24a and the connection line accommodation chamber 2c, air stream generated by the fan 7 cannot be entered into the connection line accommodation chamber 2c.

As shown in FIGS. 1 and 4, the handle housing 25 is positioned above the main housing 21, and includes a grip portion 25A, a front connecting portion 25B, and a rear connecting portion 25C. The handle housing 25 provides an internal space in which a part of the connection line accommodation chamber 2c is defined.

The grip portion 25A extends in frontward/rearward direction and is generally cylindrical for user's gripping to use the portable power planer 1. The grip portion 25A is provided with a switch mechanism 25D and a trigger switch 25E.

The switch mechanism 25D is accommodated at a front inner portion of the grip portion 25A, and is connected to the power supply portion 4, the control unit 5, and the motor 6 through a plurality of connection lines 25F. The trigger switch 25E is provided at a front lower portion of the grip portion 25A. Upon depressing the trigger switch 25E upward by a user, an electric power is supplied to the motor 6 from the power supply portion 4 through the switch mechanism 25D.

The front connecting portion 25B extends downward from a front portion of the grip portion 25A such that the front portion of the grip portion 25A and a front upper portion of the main housing 21 are connected to each other through the front connecting portion 25B. The rear connecting portion 25C extends downward from a rear portion of the grip portion 25A such that the rear portion of the grip portion 25A and an upper portion of the rear housing 24 are connected to each other through the rear connecting portion 25C. A power source installing portion 25G and a power source connecting portion 25H are provided in the rear connecting portion 25C.

The power source installing portion 25G is provided at a rear surface of the rear connecting portion 25C and is configured to install the power supply portion 4. The power source connecting portion 25H extends through an interior of the rear connecting portion 25C from the power source installing portion 25G, and is connected to the plurality of connection lines 25F. The switch mechanism 25D and the control unit 5 are electrically connected to the power supply portion 4 by the power source connecting portion 25H in a state where the power supply portion 4 is installed on the power source installing portion 25G.

As shown in FIGS. 4 and 5, the connection line accommodation chamber 2c extends over the interiors of the handle housing 25 and the rear housing 24 for accommodating the plurality of connection lines 25F which provide electrical connection among the switch mechanism 25D, the motor 6, the control unit 5 and the power source connecting portion 25H.

The connection line accommodation chamber 2c is mainly provided by an inner surface of the handle housing 25, and is partly provided by a combination of an inner surface of the rear housing 24 and a front surface of the lid portion 5D of the control unit 5. The connection line accommodation chamber 2c and the neighboring motor accommodation chamber 2a are partitioned by an inner wall through which a through-hole 2d extends for providing communication between the connection line accommodation chamber 2c and the motor accommodation chamber 2a. The connection lines 25F extend through the through-hole 2d to provide electrical connection between the motor 6 and the switch mechanism 25D.

As shown in FIGS. 1 through 4, the power supply portion 4 is a battery pack detachably attached to the power source installing portion 25G provided at the rear connecting portion 25C of the handle housing 25 for supplying electric power to the motor 6. As shown in FIG. 8, a protective IC 4A and a plurality of battery cells 41 such as lithium battery cells 4a to 4d are provided in the power supply portion 4.

An electric circuit in the portable power planer 1 will be described with reference to FIG. 8. The plurality of battery cells 41 are for the purpose of supplying electric power to the motor 6, and is electrically connected to the motor 6 by the connection line 25F through the power source connecting portion 25H and the control unit 5. The protective IC 4A is adapted to monitor a condition (voltage or electrical current) of the plurality of battery cells 41 and to output a predetermined signal indicative of over-discharge or over-current state toward the side of the main body (the side of the housing 2) from an LD terminal. The protective IC 4A is an example of a detector.

The trigger switch 25E is provided between the motor 6 and the plurality of battery cells 41. The FET 5B is rendered ON/OFF in response to a signal from the FET driver circuit 5E so as to supply or shut off electric power to the motor 6.

The FET driver circuit 5E in the control unit 5 is an analog circuit configured to output ON signal or OFF signal to the FET 5B in response to a predetermined signal from the protective IC 4A. More specifically, if the FET driver circuit 5E does not receive the predetermined signal from the protective IC 4A, the FET driver circuit 5E outputs ON signal to the FET 5B, so that the FET is turned ON. On the other hand, if the PET driver circuit 5E receives the predetermined signal from the protective IC 4A, the FET driver circuit 5E outputs OFF signal to the PET 5B, so that the PET is turned OFF. In this way, power supply to the motor 6 can be shut off in order to avoid over-discharge or over-current occurring in the plurality of battery cells 41.

In operation, upon pushing the trigger switch 25E upward by a user, electric power is supplied from the power supply portion 4 to the motor 6 through the switch mechanism 25D. Thus, the motor 6 starts rotation to rotate the rotation shaft 6A.

The rotation of the rotation shaft 6A is transmitted to the cutter block shaft 8B through the pulley 6B, the endless belt 6C, and the pulley 8C, so that the cutter block 8 is rotated in clockwise direction in FIGS. 3 and 4. Cutting work can be achieved by abutting the rear base 3 to the workpiece and moving the portable power planer 1 frontward while the cutter block 8 is rotated.

Further, by the rotation of the rotation shaft 6A, the fan 7 coaxial therewith is also rotated to generate air stream within the housing 2, so that the air can flow through the air passage provided in the housing 2.

The air passage will next be described. An arrow A shown in FIGS. 2 through 4 indicated by a broken line is a cooling air passage for cooling the control unit 5, and will be referred to as "control portion cooling passage A". An arrow B shown in FIG. 2 indicated by a solid line is a cooling air passage for cooling the motor 6, and will be referred to as "motor cooling passage B". An arrow C shown in FIG. 3 indicated by a solid line is a discharge passage for discharging the swarf, and will be referred to as "swarf discharging passage C".

First, the control portion cooling passage A will be described. Upon start of rotation of the fan 7, external air is introduced into the control portion accommodation chamber 2b through the plurality of inlet openings 24b formed at each right and left wall of the rear housing 24. The introduced external air cools down the control unit 5, and then is introduced into the motor accommodation chamber 2a through the communication passage 24a for cooling the motor 6, and then reaches the fan 7.

In this way, since the control portion cooling passage A for flowing the external cooling air from the inlet openings 24b to the fan 7 through the control portion accommodation chamber 2b, the communication passage 24a, and the motor accommodation chamber 2a is formed within the housing 2, cooling to the control unit 5 can be performed by the air stream flowing through the control portion cooling passage A. Further, cooling to the control unit 5 can be performed at first by the external air introduced into the housing 2. Accordingly, effective cooling to the control unit 5 is achievable because the cooling air just introduced into the housing 2 has a lowest temperature. Further, the fan 7 is positioned downstream of the control unit 5 in the flowing direction of the cooling air stream passing through the control portion cooling passage A. Therefore, cooling to the control unit 5 can be achieved during the process of intaking the external air by the fan 7.

The motor cooling passage B will next be described. Upon start of rotation of the fan 7, an external air is introduced into the motor accommodation chamber 2a through the plurality of inlet ports 21a formed at the right side wall of the main housing 21. The introduced external air reaches the fan 7 after cooling to the motor 6.

In this way, since the motor cooling passage B for flowing the external cooling air from the inlet ports 21a to the fan 7 through the motor accommodation chamber 2a is formed within the housing 2, cooling to the motor 6 can be performed by the air stream flowing through the motor cooling passage B. Further, the motor cooling passage B and the control portion cooling passage A are connected together at the motor accommodation chamber 2a, and then reach the fan 7. Therefore, two air streams flowing through the passages A and B can be generated by the single fan 7.

Next, the swarf discharge passage C will be described. As shown in FIG. 3, the air stream introduced into the fan 7 through the control portion cooling passage A and the motor cooling passage B is flowed into the swarf discharging hole 9a through the communication hole 9b formed in the main housing 21 and a space defined between the right side surface of the gear housing 22 and the main housing 21, and is then discharged out of the housing 2 through the right open end of the swarf discharging hole 9a.

In this way, the swarf discharge passage C is provided from the fan 7 to the right open end of the swarf discharging hole 9a for flowing the cooling air which has been passing through the control unit 5 and the motor 6. That is, within the housing 2, there are provided the air passages (in the order of the control portion cooling passage A and the swarf discharging passage C in the flowing direction) from the inlet openings 24b to the right open end of the swarf discharging hole 9a, and the air passages (in the order of the motor cooling passage B and the swarf discharge passage C in the flowing direction) from the inlet ports 21a to the right open end of the swarf discharging hole 9a.

Further, swarf generated by cutting process can be discharged outside of the housing 2 during the process of starting from the introduction of the air stream generated by the fan 7 into the swarf discharging hole 9a, and ending at the discharge of the air stream through the right open end of the swarf discharging hole 9a. Flow of the air stream from the left open end to the right open end of the swarf discharging hole 9a generates negative pressure within the swarf discharging hole 9a. Therefore, the swarf cut by the cutter block 8 is sucked into the swarf discharging hole 9a through the intake hole 9c (as indicated by an arrow D in FIG. 4). Thus, the swarf can be discharged outside the housing 2 by the air stream by the fan 7.

Accordingly, air stream generated by the fan 7 can be utilized efficiently, because air stream that has been used for cooling the control unit 5 and the motor 6 during the air-intake process can be utilized for discharging the swarf during discharging process.

In the portable power planer 1 mentioned above, upon rotation of the fan 7, air stream flows from the inlet openings 24b to the right open end of the swarf discharging hole 9a through the control portion cooling passage A. Thus, cooling to the control unit 5 can be performed, and the portable power planer 1 can restrain heat generation of the control unit 5.

Further, since the fan 7 is positioned downstream of the control unit 5 in the flowing direction of the cooling air stream passing through the control portion cooling passage A, cooling to the control unit 5 can be performed during the process of intaking the external air. Therefore, efficient cooling to the control unit 5 can be achieved.

Further, the inlet openings 24b provide communication between the exterior of the housing 2 and the control portion accommodation chamber 2b accommodating the control unit 5. Accordingly, cooling to the control unit 5 can be performed at first by the external air introduced into the housing 2, that is, cooling to the control unit 5 is performed using the external air having a lowest temperature. Consequently, cooling to the control unit 5 can be achieved efficiently.

Further, a part of the control portion accommodation chamber 2b is defined by the board box 5A. Hence, cooling to the board box 5A is performed, and the circuit board accommodated in the board box 5A can be cooled.

Further, the control portion cooling passage A extends from the inlet openings 24b to the fan 7 through the control portion accommodation chamber 2b, the communication passage 24a, and the motor accommodation chamber 2a. Moreover, the motor accommodation chamber 2a is positioned downstream of the control portion accommodation chamber 2b in the flowing direction. Thus, cooling to the electric motor 6 can be performed by using the fan flow that has cooled the control unit 5.

Further, the rear housing 24 has a rib 24E which is positioned between the communication passage 24a and the connection line accommodation chamber 2c and the rib 24E prevents the communication passage 24a from being communicated with the connection line accommodation chamber 2c. Therefore, the rib 24E prevents the air stream directing from the control portion accommodation chamber 2b toward the motor accommodation chamber 2a from flowing and diffusing into the connection line accommodation chamber 2c. As a result, air stream can be exclusively utilized for cooling the control unit 5 and the electric motor 6, and enhanced cooling efficiency can be obtained.

Further, the portable power planer 1 has the rear base 3 supported to the housing 2 and configured to be in abutment with the workpiece, and the rear base 3 defines a part of the communication passage 24a. In order to form the communication passage 24a, a metal mold die is removed downward in FIG. 5 to form the through-hole 24c, and then an outer open end of the through-hole 24c is closed by the rear base 3, thereby forming the communication passage 24a.

Further, the interior space of the housing 2 provides the motor cooling passage B extending from the inlet ports 21e to the fan 7 via the motor accommodation chamber 2a, and the control portion cooling passage A is connected to the motor cooling passage B. Thus, the motor cooling passage B and the control portion cooling passage A are connected together at the motor accommodation chamber 2a, and then reach the fan 7. Therefore, two air streams flowing through the passages A and B can be generated by the single fan 7.

Further, the fan 7 is positioned upstream of the swarf discharging portion 9 in a direction of flowing the air stream through the swarf discharging passage C. Consequently, the swarf can be discharged outside of the housing 2 during the process of discharging the air stream. Accordingly, air stream that has been used for cooling the control unit 5 during the process of intaking the air can be utilized for discharging the swarf during discharging process. Thus, air stream can be utilized efficiently.

Further, since the control unit 5 is positioned opposite to the cutter block 8 with respect to the electric motor 6, air stream can be flowed smoothly when discharging, by the air stream that has been used for cooling the control unit 5, the swarf generated by cuffing operation with the cutter block 8 out of the housing 2.

Further, the power supply portion 4 includes the battery pack in which the plurality of battery cells 41 are detachably installable, and the control unit 5 is positioned between the battery pack and the cutter block 8. Accordingly, the battery pack does not exist between control unit 5 and the cutter block 8, and air stream that has been used for cooling the control unit 5 can be smoothly flowed toward the cutter block 8. Hence, the swarf generated the cutting operation with the cutter block 8 can be discharged efficiently.

Further, the control unit 5 is configured to shut off power supply to the electric motor 6 in accordance with a state of the plurality of battery cells 41 in the battery pack for avoiding over-discharge or over-current occurring in the plurality of battery cells 41. Therefore, occurrence in over-discharge or over-current can be avoided, and therefore, excessive load application to the plurality of battery cells 41 can be avoided, thereby prolonging service life of the battery cells and protecting the FETs 5B accommodated in control unit 5.

Further, the battery pack is provided with the protective IC 4A configured to detect the state of the battery cells 41, and the control unit 5 is configured to shut off power supply to the electric motor 6 in response to a result of detection by the protective IC 4A. Thus, accuracy of detecting the state of the battery cells 41 can be enhanced, thereby further avoiding over-discharge or over-current.

A portable power planer 200 according to a second embodiment of the present invention will be described with reference to FIG. 9, wherein like parts and components are designated by the same reference numerals and characters as those shown in FIGS. 1 through 8 to avoid duplicating description.

Figure 9:
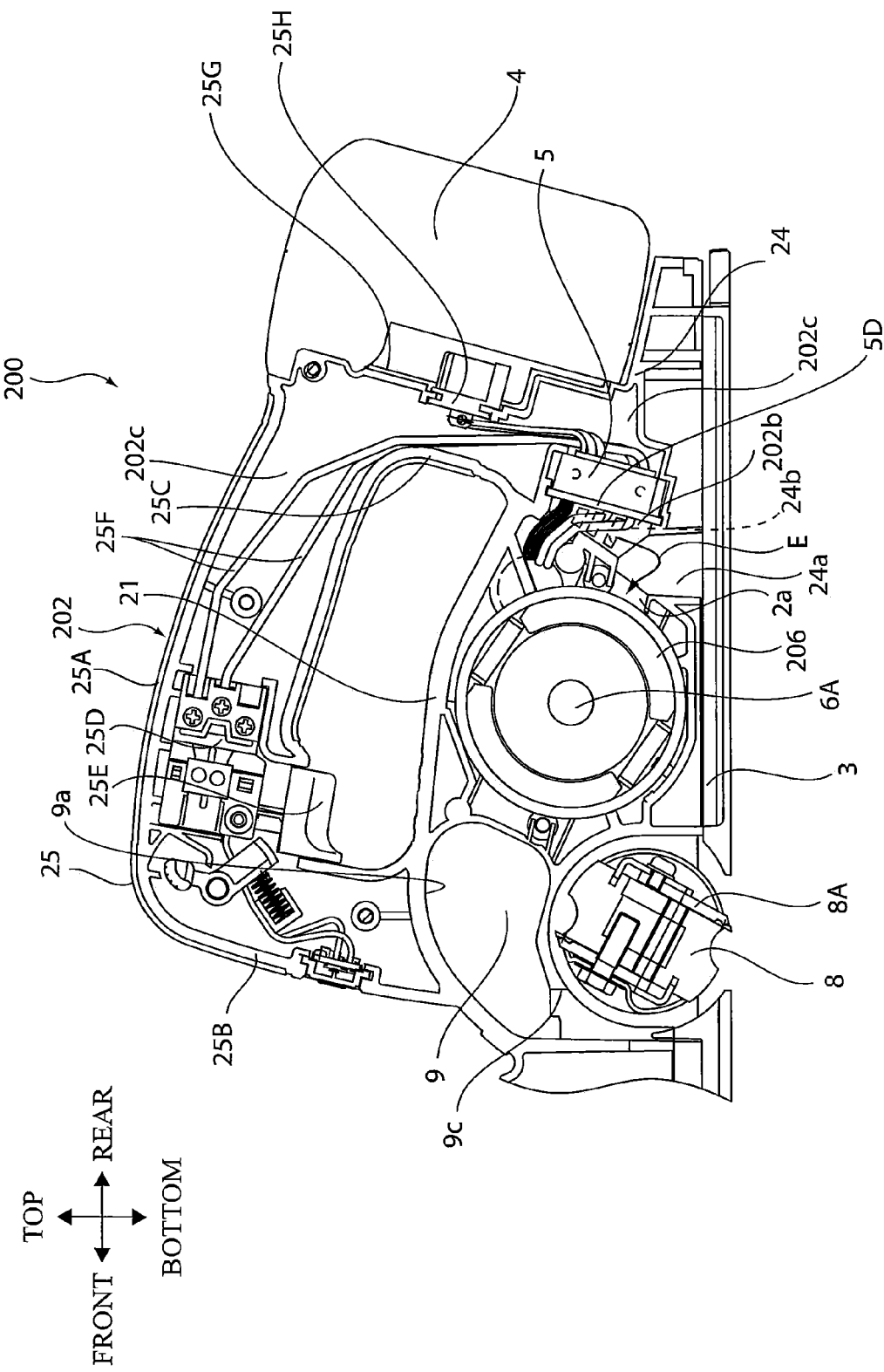
FIG. 9 is a partial cross-sectional side view of a portable power planer for showing an internal structure according to a second embodiment of the present invention.

As shown in FIG. 9, the portable power planer 200 includes an electric motor 206, and a housing 202 in which a control portion accommodation chamber 202b and a connection line accommodation chamber 202c are defined. The motor 206 is a brushless motor, and the control unit 5 is exclusively used for electrical connection between the motor 206 and the power supply portion 4 to control the motor 206.

The control portion accommodation chamber 202b is defined in an interior of the rear housing 24 and is positioned rearward of and adjacent to the motor accommodation chamber 2a.

The connection line accommodation chamber 202c is defined in interiors of the handle housing 25 and the rear housing 24. The connection line accommodation chamber 202c has a lower portion positioned rearward of and adjacent to the control portion accommodation chamber 202b. Further, the control portion accommodation chamber 202b is defined by an inner surface of the rear housing 24 and the lid 5D. The control portion accommodation chamber 202b is isolated from the connection line accommodation chamber 202c.

With this structure, the trigger switch 25E is not directly connected to the motor 6 through the connection line 25F. Therefore, the control portion accommodation chamber 202b can be positioned adjacent to the motor accommodation chamber 2a without providing the connection line accommodation chamber 202c therebetween. Accordingly, air stream generated by the fan 7 and flowing along an air passage E is introduced into the housing 202 through the inlet openings 24b, and can be smoothly flowed into the motor accommodation chamber 2a through the control portion accommodation chamber 202b. The passage E can be referred to as a control portion cooling air massage E. Further, the external air introduced into the control portion accommodation chamber 202b from the inlet openings 24b is not diffused into the connection line accommodation chamber 202c, but can be introduced into the motor accommodation chamber 2a through the communication passage 24a.

While the invention has been described in detail with reference to the above-described embodiments thereof, it would be apparent to those skilled in the art that various changes and modifications may be made therein without departing from the spirit of the invention.

What is claimed is:

1. A power planer comprising:
   an electric motor having a rotation shaft extending in an extending direction;
   a battery pack configured to supply electric power to the electric motor;
   a driver circuit configured to control the electric motor;
   a casing formed with an inlet opening and a discharge opening, the casing defining:
      a motor accommodation chamber accommodating therein the electric motor, the inlet opening being formed at the motor accommodation chamber;
      a circuit accommodation chamber accommodating therein the driver circuit, the circuit accommodation chamber having one side wall and another side wall in the extending direction, each of the one side wall and the another side wall being formed with a through-hole providing communication between an interior of the circuit accommodation chamber and an exterior of the casing;
      a communication passage providing communication between the motor accommodation chamber and the circuit accommodation chamber, the communication passage being positioned between the motor accommodation chamber and the battery pack; and
   a swarf discharging portion from which swarf is discharged, the discharge opening being formed at the swarf discharging portion;
   a cutter block having an axis directed in parallel to the rotation shaft, the cutter block being supported to the casing and rotatable about the axis, a blade for cutting a workpiece being attachable to and detachable from the cutter block, the cutter block being rotationally driven upon rotation of the rotation shaft;
   a fan provided in the casing and configured to generate air stream within the casing, the inlet opening being positioned at one side of the electric motor and the fan being positioned at another side of the electric motor in the extending direction; and
   a base supported to the casing and configured to be abutted on the workpiece,
   wherein the circuit accommodation chamber, the communication passage, and the motor accommodation chamber are positioned such that an imaginary plane perpendicular to the extending direction passes through the circuit accommodation chamber, the communication passage, and the motor accommodation chamber, wherein the circuit accommodation chamber and the communication passage provide a first cooling air passage connecting the through-holes and the fan, the motor accommodation chamber provides a second air cooling passage connecting the inlet opening and the fan, and the first cooling air passage and the second cooling air passage are connected to each other within the motor accommodation chamber, and wherein air introduced via the inlet opening into the motor accommodation chamber cools the electric motor and then is discharged from the discharge opening.

2. The power planer as claimed in claim 1, wherein the driver circuit comprises a control board on which a control element is surface-mounted for controlling power supply to the electric motor, and a board case accommodating therein the control board, the first cooling air passage having a part defined by an inner surface of the driver circuit accommodation chamber and the board case.

3. The power planer as claimed in claim 1, wherein the motor accommodation chamber is positioned downstream of the driver circuit accommodation chamber in a flowing direction of the air introduced via the inlet opening.

4. The power planer as claimed in claim 1, further comprising a plurality of connection lines connecting the driver circuit to the electric motor and to the battery pack; and
   wherein the interior space of the casing further defines a connection line accommodation chamber for accommodating therein the plurality of connection lines, the connection line chamber being positioned between the driver circuit accommodation chamber and the motor accommodation chamber, the casing having a partition wall positioned between the communication passage and the connection line accommodation chamber.

5. The power planer as claimed in claim 1, further including a swarf discharging passage in communication with the driver circuit cooling passage and extending through the fan to the discharge opening such that the fan is positioned upstream of the swarf discharging passage in a direction of flowing the air stream through the swarf discharging passage.

6. The power planer as claimed in claim 1, wherein the driver circuit is positioned opposite to the cutter block with respect to the electric motor.

7. The power planer as claimed in claim 1, wherein the driver circuit is positioned between the battery pack and the cutter block.

8. The power planer as claimed in claim 1, wherein the battery pack includes a plurality of battery cells, and
    wherein, in controlling the electric motor, the driver circuit shuts off power supply to the electric motor in accordance with a state of the plurality of battery cells in the battery pack for avoiding at least one of over-discharge and over-current occurring in the plurality of battery cells.

9. The power planer as claimed in claim 8, wherein the battery pack is provided with a detector configured to detect the state of the plurality of battery cells, and
    wherein, in controlling the electric motor, the driver circuit shuts off power supply to the electric motor in response to a result of detection by the detector.

10. The power planer as clamed in claim 1, wherein one of the through-holes is a second inlet opening.

11. The power planer as claimed in claim 10, wherein another of the through-holes is a third inlet opening.

12. The power planer as claimed in claim 1 wherein the electric motor is a brushless motor.

13. The power planer as claimed in claim 10, wherein the first cooling air passage is defined from the second inlet opening to the motor accommodation chamber for cooling the driver circuit.

14. The power planer as claimed in claim 13, further comprising at least one FET controlled by the driver circuit to start and stop power supply to the electric motor.

\* \* \* \* \*